LITHOGRAPHIC PLATE CLEANER AND REGREASER

Grant C. Beutner, Waukesha, Wis., assignor to RB and P Chemical and Supply, Incorporated, Milwaukee, Wis., a corporation of Wisconsin
No Drawing. Filed Sept. 27, 1961, Ser. No. 140,985
3 Claims. (Cl. 101—149.2)

This invention relates to a lithographic plate cleaner and regreaser.

Lithographic plates used in the graphic arts have image areas which are oleophilic (grease retaining) and non-image areas which are hydrophilic (water retaining). This maintains the definition of the ink when the plate is used in the press to produce a clear image. After repeated use of the plate and aging of the surface, the non-image areas of the plate are less able to reject ink and may tend to retain some ink. This is called scumming. The image areas of the plate may also become less oleophilic and hence less able to hold the ink. This may result in what is known as a blind plate.

The reason for the deterioration in the quality of the plate is at least partly because the grease and ink in the image areas tend to dry out and become difficult to remove. The ink desensitizing chemicals on the non-image areas (gum arabic, etc.) also frequently wear off the plate or lose their capacity to reject ink after repeated exposure to moisture, change of pH values, etc.

When this condition results in the plate, a very poor printing job will result and it is typically necessary for the lithographer to spend many hours cleaning the plate to try to restore it to good condition. However, regardless of what the lithographer can do using current techniques, it is very difficult to bring the plate back to optimum condition.

This invention relates to a chemical solution which both cleans from the plate dried ink and gum and then regreases the image areas to restore it to optimum grease-retaining condition, and at the same time keeps the grease from depositing on the non-image areas of the plate.

While there is a broad range of equivalents, the ingredients of the composition of the present invention are:

(1) An organic solvent which dissolves the dried ink (e.g. xylene, toluene, etc.).
(2) Water which dissolves crystallized gum or other water soluble materials from the image areas of the plate.
(3) An unstable fatty acid or greasy emulsifier such as ammonium oleate, which will concentrate in the image areas of the plate. This unstable emulsifier will quickly break down to deposit its fatty acid or greasy component on the image area and thus regrease the plate. In this specification such an unstable fatty acid or greasy emulsifier will sometimes be termed a metastable oleophilic surface active agent.
(4) An agent to desensitize the non-image areas against ink retention, such as carboxy methyl cellulose, gum arabic, etc., and which will concentrate over and be deposited on the non-image areas to help keep these areas hydrophilic.

In use, the solution is wiped onto a lithographic plate and evenly distributed over the entire surface. The ammonium oleate or like metastable oleophilic surface active agent will be attracted to and will concentrate over the image areas. It will take about thirty or forty seconds to do this. The solution is then left to set for another thirty or forty seconds. During this time, the ammonium oleate breaks down to deposit oleic acid, which is very greasy, on the image areas, the ammonia being evaporated as a gas. The gum arabic and water keep the non-image areas free of any such deposits. The plate is then flushed with water to remove the dried inks and gum which have emulsified in the solvent components of the solution and the plate is ready for reuse. This takes a minimum of time (two or three minutes).

A typical chemical reaction to produce the unstable fatty emulsion is to combine oleic acid with a volatile alkali or base such as ammonium hydroxide, as follows:

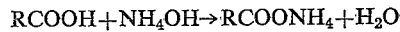

(NOTE:—"R" is the oleoyl radical represented by the formula $CH_3(CH_2)_7CH=CH(CH_2)_7$)

The resultant unstable ammonium oleate will break down when applied to the plate, aforesaid, as follows:

The oleic acid (RCOOH) regreases the image areas of the plate and the ammonia gas ($NH_3$) evaporates.

Other examples of fatty acids which could be used in lieu of oleic acid in combination with a volatile alkali, are, for example:

Linoleic acid
Palimitic acid
Stearic acid
Lauric acid

Other examples of volatile alkali or base reactants are:

Morpholine
Triethylamine
Diethylamine

The following are examples of specific compositions which embody the invention as herein disclosed:

(1) 13 gals. xylol
21 lbs. oleic acid
8 lbs. aqua ammonia
7½ gals. gum arabic sol., 14° Baumé
10 gals. tap water (2) 13 gals. xylol
21 lbs. oleic acid
12 lbs. morpholine
8 gals. gum arabic sol., 14° Baumé
12 gals. tap water (3) 10 gals. petroleum naphtha
18 lbs. stearic acid
8 lbs. aqua ammonia
7½ gals. gum arabic sol., 14° Baumé
10 gals. tap water (4) 12 gals. toluene
21 lbs. oleic acid
12 lbs. morpholine
7½ gals. of 6% water solution of carboxyl methyl cellulose
10 gals. tap water

I claim:
1. A composition to clean dried ink and gum from the image area of a lithographic plate and to regrease the same and comprising an organic solvent to dissolve the dried ink, water to dissolve the gum, a metastable oleophilic surface active agent which will concentrate on the image areas of the plate and break down to deposit grease thereon and an agent to desensitize the non-image area of the plate against ink retention.

2. The composition of claim 1 in which the metastable oleophilic surface active agent is the reaction product of a fatty acid and a volatile alkaline agent.

3. The method of cleaning dried ink and gum from the image area of a lithographic plate and regreasing the same comprising the steps of distributing over the surface of the plate a liquid composition including an organic solvent, water, a metastable oleophilic surface active agent and an ink desensitizer, exposing the plate to said composition for a time sufficient for the metastable oleophilic agent to break down and deposit grease on the image area and thereafter flushing the plate to remove the ink and gum which have emulsified in the solvents.

No references cited.